Patented Sept. 9, 1952

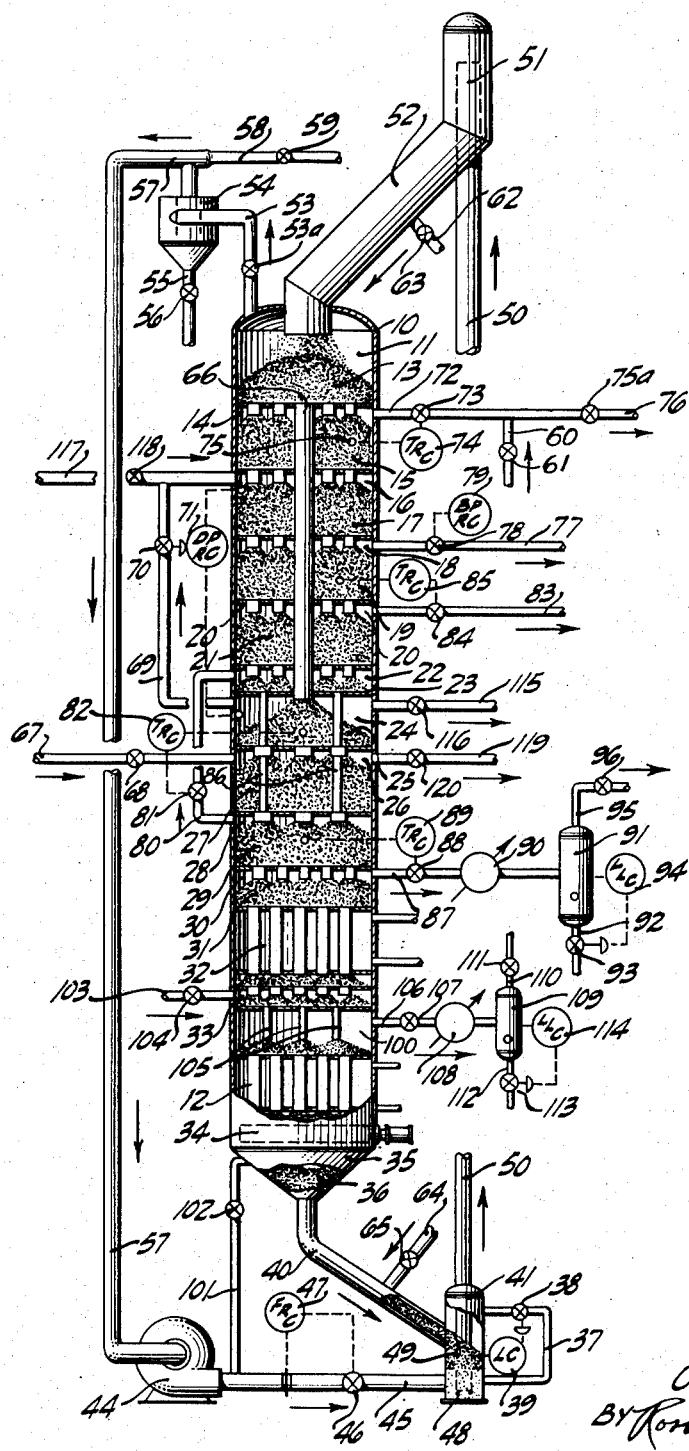
Sept. 9, 1952     C. H. O. BERG     2,609,887
ADSORPTION PROCESS AND APPARATUS
Filed April 30, 1949
INVENTOR.
CLYDE H. O. BERG,
BY Ross J. Garofalo
ATTORNEY.

2,609,887

UNITED STATES PATENT OFFICE 2,609,887

ADSORPTION PROCESS AND APPARATUS

Clyde H. O. Berg, Long Beach, Calif., assignor to Union Oil Company of California, Los Angeles, Calif., a corporation of California Application April 30, 1949, Serial No. 90,708

22 Claims. (Cl. 183—4.2)

This invention relates to a process and apparatus for the continuous separation of normally gaseous mixtures into a plurality of substantially pure fractions through selective adsorption of such mixtures on moving beds of solid granular adsorbents. This invention further relates more specifically to an improved process in which the moving bed of adsorbent is passed through a substantially vertical column through a succession of individual adsorption and reflux zones and the rich adsorbent thus formed is passed successively through a heating zone, a seal gas removal zone and a cooling zone immediately prior to being removed from the bottom of the column. The adsorbent thus removed is cool, of the order of 100° F. and a cool lift gas is recirculated. Applications, Serial Numbers 90,709 and 90,710 filed of even date herewith now Patents 2,539,005 and 2,539,006, respectively, disclose related subject matter.

It is an object of the present invention to provide an improved selective adsorption process wherein recirculation of the adsorbent from the bottom to the top of the column is considerably simplified by cooling the adsorbent after the adsorbed constituents have been removed and prior to removing the adsorbent from the column.

It is an additional object to provide an improved process in which greater quantities of adsorbent may be suspended in a unit volume of lift gas for conveyance from the bottom to the top of the adsorption column.

It is a further object of this invention to provide in the selective adsorption process a method whereby adsorbed constituents may be desorbed from the rich adsorbent and the hot adsorbent thus resulting may be cooled in the presence of a lean gas immediately in succession in the adsorption column by providing a positive sealing zone between the heating and cooling zones.

An additional object of the present invention is to provide a method for maintaining positive control over the sealing zone established between the heating zone and the cooling zone in the bottom of the column.

It is also an object of this invention to provide an apparatus to permit accomplishment of the foregoing objects.

Other objects and advantages of this invention will become apparent to those skilled in the art as the description thereof proceeds.

Briefly, this invention comprises an improved selective adsorption process in which a substantially compact moving bed of solid granular adsorbent flows by gravity downwardly successively through a separation zone, a rectification zone, a preferential desorption zone, a heating zone, a seal gas removal zone, and a cooling zone as it passes through the adsorption column. The adsorbent is withdrawn from a point below the cooling zone and the cool lean adsorbent is recirculated for introduction into the separation zone and repassage through the column. The separation zone may be considerably modified to contain one or more adsorption and rectification zones. It may be provided with means for dividing the adsorbent flowing therethrough into at least two separate and independent adsorbent streams to obtain special degrees of rectification and separation of the gaseous mixture into a plurality of substantially pure product streams. Such a modification of the separation zone will be hereinafter more fully described.

The gaseous mixture to be separated is introduced into the separation zone where the adsorbent is enriched with the more readily adsorbable constituents of the gaseous mixture forming a rich adsorbent which is passed through the rectification zone and introduced into the preferential desorption zone. Herein the preferential adsorption of a stripping gas causes desorption of these constituents from the adsorbent to form a rich gas product. The partially stripped adsorbent thus formed passes downwardly through the heating zone wherein the adsorbent temperature is raised and the adsorbent is countercurrently contacted with further quantities of stripping gas introduced at a point below the heating zone. The hot lean adsorbent passes from the heating zone through a sealing gas removal zone concurrently with part of the stripping gas and then into an indirect cooling zone. The purge gas, comprising a fraction of the lean gas product and containing the least readily adsorbable constituents of the gaseous mixture is introduced into the bottom of the column and passes upwardly through the cooling zone countercurrent to the downwardly flowing lean adsorbent therein. This purge gas serves to remove traces of stripping gas adsorbed on the adsorbent and also to prevent that portion of the stripping gas entering the sealing gas removal zone from passing into the cooling zone wherein it would rapidly be adsorbed and condensed thereby seriously effecting the adsorbent flow characteristics. A mixture of stripping gas and purge gas is formed in the sealing gas removal zone and this seal gas is removed therefrom at such a rate as to maintain a pressure within the seal gas removal zone which is somewhat less than either pressure existing in the heating and cooling zone. By this method the stripping gas present in the heating zone is prevented from deleteriously affecting the adsorbent flow characteristics in the cooling zone and the purge gas passing through the cooling zone is prevented from entering and contaminating the rich gas product removed from the heating zone. These are two of the advantages realized according to this invention. Other advantages include an absolute control over the quantity of purge gas introduced into the bottom of the column, the removal of cool lean adsorbent from the bottom of the column at a temperature of about 100° F. which facilitates its conveyance to the top of the column for recirculation, the elimination of the necessity for using extensive expansion joint provisions in the lift line through which the adsorbent is conveyed, the recirculaton of a lift gas of considerably increased density and viscosity and consequently greater suspending powers for the adsorbent, and the simplification of blowing apparatus required for recirculation of low temperature lift gas in the system. There are other advantages that will become apparent to those skilled in this art as the description and illustration of the present invention further proceeds.

To facilitate illustration of the present invention and the description of the process and apparatus thereof a drawing is included in which a combination schematic flow diagram of the improved selective adsorption process and a vertical cross section elevation of the improved selective adsorption column is shown.

Referring now more particularly to the drawing, selective adsorption column 10 is provided at successively lower levels therein with elutriation zone 11, hopper 13, lean gas disengaging zone 14, secondary adsorption zone 15, secondary feed gas engaging zone 16, first side cut rectification zone 17, first side cut disengaging zone 18, second side cut rectification zone 19 which may be also termed "first side cut desorption zone 19," second side cut disengaging zone 20, second side cut desorption zone 21, primary reflux gas engaging zone 22, column divider 23, secondary feed disengaging zone 24, primary adsorption zone 25, feed gas engaging zone 26, primary rectification zone 27, primary reflux gas disengaging zone 28, secondary rectification zone 29, rich gas disengaging zone 30, preferential desorption or steaming zone 31, indirect heating zone or stripper 32, stripping gas engaging zone 33, seal gas removal zone 100, indirect cooler 12, feeder zone 34 and bottom zone 35. That portion of column 10 included between hopper zone 13 and rich gas disengaging zone 30 may be termed the separation zone in which the modification shown in the drawing is one of several to be subsequently described. That part of the separation zone between zone 13 and column divider 23 is known as a side cut gas zone or secondary separation zone while the remaining part of the separation zone between column divider 23 and disengaging zone 30 is known as a feed gas zone or primary separation zone in the modification shown. In the separation zone shown on the drawing two separate and individual streams of granular adsorbent are employed, one each passing through the primary and secondary separation zones. The adsorbent passing from zone 13 is divided into these two streams which are subsequently combined as they pass through zone 28 into secondary rectification zone 29. From this point the adsorbent is heated to effect desorption of the rich gas, passed through a sealing zone from which a seal gas is removed, then passed through a cooling zone to form a cool lean adsorbent which is then conveyed by a high density lift gas to the separation zone for recirculation through the column.

In bottom zone 35 an accumulation of adsorbent 36 is maintained by the cooperative action of level control 39 and control valve 38 whereby transfer line 40 is maintained full of flowing adsorbent. In another modification transfer line 40 may be maintained only partially full of flowing adsorbent so that part of the lift gas may pass directly from zone 41 into bottom zone 35. The adsorbent passes from accumulation 36 via transfer line 40 into induction zone 41. A lift gas is introduced under pressure exerted by lift gas blower 44 via line 45 controlled by valve 46 under the action of flow recorder controller 47 into lift gas inlet zone 48 of induction zone 41. The lift gas passes upwardly through solids inlet zone 49, picking up the adsorbent, forming a suspension and passes via lift line 50 into impactless separator 51. Herein the adsorbent suspension is broken and the adsorbent and lift gas pass as substantially independent phases through transfer line 52 to collect in the upper portion of column 10. The lift gas passes from column 10 via line 53 into separator 54 wherein suspended adsorbent fines are separated to be removed via line 55 controlled by valve 56. The fines-free lift gas then passes via lift gas return line 57 to the suction inlet of blower 44 for recirculation. Accumulations of lift gas in this cycle are withdrawn continuously via line 58 controlled by valve 59. If desired this gas may be combined with the lean gas product by means of line 60 controlled by valve 61. A controlled quantity of recirculating lift gas passes from the outlet of lift gas blower 44 through line 101 controlled by valve 102 into bottom zone 35. This gas passes upwardly through cooling zone 12 and supplies the purge gas referred to above.

During operation, it is desirable to remove accumulations of high molecular weight constituents from the carbon such as are formed by polymerization of acetylene or components such as normally liquid hydrocarbons present in the feed gas. To accomplish this about 5% or so of the carbon circulated is removed from transfer line 52 by means of line 62 controlled by valve 63 and is passed through a high temperature reactivator in which the carbon is contacted with reactivation steam while being heated to a temperature of from 500° F. to 2000° F. or higher. The desorbable materials are removed from the carbon at the lower reactivation temperatures and may be combined with the rich gas product. For desorption of high molecular weight constituents the reactivator operates at about 1000°–1100° F. which is just below the gasification temperature. When the charcoal activity is lowered, the reactivator temperature is increased to 1700°–1800° F. for a sufficient period of time to restore the desired activity or adsorptive capacity of the charcoal and then returned to 1000°–1100° F. A preferential water gas reaction occurs at the higher temperatures whereby the high molecular weight nondesorbable hydrocarbons are converted to carbon monoxide and hydrogen leaving the carbon in a reactivated state. It is then combined via line 64 controlled by valve 65 with carbon flowing via transfer line 40 into lift line 50.

The description of the apparatus of this invention and the process involved in separating a gaseous mixture thereby into four substantially pure fractions, including ethylene and propylene concentrates, may be more readily understood from the following description which is in the form of a practical example. Although the example is directed to the separation of hydrocarbon gases, the process is not to be considered as limited only to the separation of such gases since the description is merely an illustration of the operation whereby two rectified and substantially pure heart cut or side cut fractions are obtained.

EXAMPLE I

A selective adsorption column 12.0 feet in diameter and designed according to the accompanying drawing utilizes a circulation of activated vegetable charcoal amounting to 330,000 pounds per hour. The charcoal has a mesh size range of 12 to 30. The charcoal circulation is divided into two streams at zone 13 and 230,000 pounds per hour pass directly into secondary adsorption zone 15 for passage through the secondary separation zone and the remaining 100,000 pounds per hour pass downwardly through and independent of the secondary separation zone through conduit 66 for introduction into primary adsorption zone 25 and subsequently through the primary separation zone. The feed gas, a cracked petroleum hydrocarbon gas mixture flowing at a rate of 2141 pound mols per hour, has the following composition:

TABLE 1

*Feed gas composition*

| Constituent | Mol Percent |
| --- | --- |
| Hydrogen | 17.86 |
| Methane | 40.11 |
| Ethylene | 9.15 |
| Ethane | 24.88 |
| Propylene | 2.42 |
| Propane | 4.13 |
| Butenes | 0.34 |
| Butanes | 0.65 |
| $C_5$'s | 0.21 |
| $C_6+$ | 0.25 |
| Total | 100.00 |

The feed gas is introduced at a pressure of 150 pounds per square inch gauge via line 67 at a rate controlled by valve 68 into feed gas engaging zone 26. It contacts 100,000 pounds per hour of activated carbon in primary adsorption zone 25 wherein the $C_3$ and higher molecular weight hydrocarbons are adsorbed together with a small proportion of $C_2$ and lower molecular weight hydrocarbons to form a rich charcoal. In primary adsorption zone 25 a $C_2$–$C_3$ separation is made in the presence of $C_1$ hydrocarbon which has been found to facilitate the separation by reducing the charcoal rate required. The $C_2$ and lower molecular weight constituents remain substantially unadsorbed as a secondary feed gas and are removed from secondary feed disengaging zone 24 and passed via line 69 controlled by valve 70 into secondary feed engaging zone 16 in the secondary separation section. The treatment of the rich charcoal formed in primary adsorption zone 25 will be subsequently described.

Valve 70 controlling the rate of secondary feed introduction is actuated by differential pressure controller 71 to maintain a constant differential pressure between disengaging zone 24 and engaging zone 16. The secondary feed, comprising substantially all the $C_2$ and lower molecular weight constituents, is countercurrently contacted by 230,000 pounds per hour of carbon in secondary adsorption zone 15. The $C_1$–$C_2$ hydrocarbon separation is effected here in the absence of the $C_3$ hydrocarbons which were adsorbed and removed from the gas stream during passage through primary adsorption zone 25. The $C_2$ hydrocarbon fraction together with a small quantity of $C_1$ hydrocarbon is adsorbed in secondary adsorption zone 15 to form a second rich charcoal and the major proportion of hydrogen and $C_1$ hydrocarbon is substantially unadsorbed. This gas accumulates in lean gas disengaging zone 14 and a lean gas product stream is removed therefrom via line 72 at a rate controlled by valve 73 which in turn is actuated by temperature recorder controller 74 having thermocouple point 75 in contact with the adsorbent in zone 15. The lean gas product flows at a rate of 1241 pound mols per hour, is sent to storage or further processing facilities not shown by means of line 76, and has the composition given below:

TABLE 2

*Lean gas product composition*

| Constituent | Mol Percent |
| --- | --- |
| Hydrogen | 30.81 |
| Methane | 69.03 |
| Ethylene | 0.06 |
| Ethane | 0.10 |
| Total | 100.00 |

If desired, a $H_2$–$C_1$ separation can be made in secondary adsorption zone 15 whereby the lean gas product comprises substantially pure hydrogen. Such a separation requires a higher charcoal rate in the secondary separation zone since the $C_1$ hydrocarbon is adsorbed along with the $C_2$ hydrocarbons from the hydrogen.

A portion of the unadsorbed gas passes upwardly from lean gas disengaging zone 14 through zone 13 into elutriation zone 11. Here it combines with the lift gas introduced into the top of the column with the adsorbent passing through transfer line 52 and assists in suspending unwanted adsorbent fines whereby they are removed from the circulating stream.

The second rich charcoal formed in secondary adsorption zone 15 passes downwardly into first side cut rectification zone 17. Herein the charcoal is contacted with a reflux gas comprising substantially pure $C_2$ hydrocarbons. A preferential desorption of adsorbed $C_1$ hydrocarbon results, the desorbed $C_1$ hydrocarbon passing upwardly to combine with the lean gas product and a second partially rectified charcoal substantially free of $C_1$ and lower molecular weight constituents is formed. This charcoal passes downwardly into second side cut rectification zone 19 wherein the second partially rectified charcoal is contacted by a countercurrent flow of $C_3$ hydrocarbon reflux. The preferential desorption of $C_2$ hydrocarbons by the $C_3$ hydrocarbons is herein effected. Part of the $C_2$ hydrocarbons are employed as above described as the $C_2$ reflux in first side cut rectification zone 17 and are eventually removed with the remaining part of $C_2$ hydrocarbons from first side cut disengaging zone 18 via line 77 controlled by valve 78 in turn regulated by back pressure recorder controller 79. The first side cut gas product passes via line 77 at a rate of 730 pound mols per hour to further processing facilities or storage not shown and has the following composition:

TABLE 3

*First side cut gas composition*

| Constituent | Mol Percent |
|---|---|
| Methane | 0.29 |
| Ethylene | 26.74 |
| Ethane | 72.77 |
| Propylene | 0.09 |
| Propane | 0.11 |
| Total | 100.00 |

The charcoal in second side cut rectification zone 19, from which the $C_2$ hydrocarbons have been desorbed and which contain only $C_3$ hydrocarbons substantially uncontaminated by higher or lower molecular weight constituents, passes downwardly into second side cut desorption zone 21. A primary reflux gas containing $C_3$ and $C_4$ hydrocarbon constituents formed in secondary rectification zone 29, as hereinbelow more fully described, passes via line 80 at a rate controlled by valve 81 and actuated by temperature recorder controller 82 into primary reflux gas engaging zone 22. This gas passes upwardly countercurrent to the partially rectified charcoal present in second side cut desorption zone 21 to preferentially desorb the $C_3$ constituents while adsorbing the $C_4+$ hydrocarbon constituents. The thus desorbed $C_3$'s are partially employed as the aforementioned $C_3$ reflux in second side cut rectification zone 19 and the remainder is removed from second side cut disengaging zone 20 via line 83, at a rate controlled by valve 84 and temperature recorder controller 85 at a rate of 140 pound mols per hour. This second side cut gas product has the following composition:

TABLE 4

*Second side cut gas composition*

| Constituent | Mol Percent |
|---|---|
| Ethylene | 0.07 |
| Ethane | 0.13 |
| Propylene | 36.66 |
| Propane | 62.64 |
| Butenes | 0.20 |
| Butanes | 0.30 |
| Total | 100.00 |

The second rectified charcoal, substantially saturated with $C_4$ and higher molecular weight hydrocarbons and substantially free of $C_3$ hydrocarbons, passes downwardly through primary reflux gas engaging zone 22, through and independent of the primary separation zone via conduits 86, and into secondary rectification zone 29 wherein it is combined with charcoal flowing through primary reflux gas disengaging zone 28 from the primary separation zone.

The rich charcoal present in primary adsorption zone 25 contains $C_3$ and higher molecular weight hydrocarbons together with a small proportion of $C_2$ and lighter constituents. It passes into primary rectification zone 27 wherein the charcoal is contacted by a countercurrent flow of part of the aforementioned primary reflux gas. The $C_2$ and lower molecular weight constituents are preferentially desorbed to form a first partially rectified charcoal. This charcoal is combined with that removed from the bottom of the secondary separation zone and introduced directly into secondary rectification zone 29. Herein the partially rectified carbon is contacted with a countercurrent reflux gas containing $C_4$ and higher molecular weight hydrocarbons. A preferential desorption of substantially all of the $C_3$ hydrocarbons is effected forming a gas containing $C_3$ hydrocarbons as the lowest molecular weight constituents and also containing some $C_4$ and higher molecular weight constituents. This gas is the primary reflux gas which is employed as above described.

The rectified charcoal removed from the bottom of secondary rectification zone 29 passes into preferential desorption zone or steaming zone 31. Herein the rectified charcoal is contacted with a countercurrent flow of steam which is preferentially adsorbed at the temperature of the carbon causing an immediate desorption of the major proportion of the $C_4$ hydrocarbon constituents as well as a partial desorption of the higher molecular weight constituents leaving a partially stripped charcoal. The desorbed gases are partly introduced into secondary rectification zone 29 as reflux to be preferentially adsorbed therein while the remainder is removed via line 87 controlled by valve 88 which in turn is actuated by temperature recorder controller 89. The rich gas is introduced into cooler 90 wherein the stripping steam is condensed. The condensate is separated from the cooled rich gas in separator 91 from which it is removed via line 92 controlled by valve 93 under action of liquid level controller 94. The rich gas product from which the major proportion of stripping gas has been removed passes from separator 91 via line 95 controlled by valve 96.

The partially stripped charcoal, saturated with stripping steam, passes from preferential adsorption zone 91 downwardly through the tubes of indirect heater 32 through which an upward flow of stripping gas is maintained. Stripping steam is introduced into stripping gas engaging zone 33 via line 103 controlled by valve 104, a portion of which passes downwardly concurrently with the charcoal into seal gas removal zone 100 while the major proportion passes upwardly through the tubes of indirect heater 32. The temperature to which the carbon is heated during passage through stripper 32 is between 500° F. and 600° F. Here substantially all of the absorbed $C_4$ hydrocarbons are removed from the adsorbent and are combined with the rich gas product.

These temperatures are insufficient to remove adsorbed $C_5$ and $C_6$ hydrocarbons adsorbed on the carbon. To effect the removal of these higher molecular weight hydrocarbons and to reactivate the carbon by removing traces of nondesorbable constituents, a small portion of the circulating charcoal stream is conveyed through a reactivator, not shown, but described above. The steam plus desorbed hydrocarbons removed from the reactivator at about 1000° F. are passed through a cooler in much the same way as the rich gas removed from the stripper 32. Hydrocarbon constituents are thus separated from the stripping gas by condensation and/or decantation and are combined with the rich gas removed via line 95 from separator 91. The combination of the thus desorbed higher molecular weight hydrocarbons comprises the rich gas product in this particular operation. These constituents are produced at the rate of 30 pound mols per hour and have the following composition:

TABLE 5

*Rich gas product composition*

| Constituent | Mol Percent |
|---|---|
| $C_3$'s | 0.20 |
| $C_4$'s | 66.74 |
| $C_5$'s | 15.18 |
| $C_6+$ | 17.88 |
| Total | 100.00 |

Seal gas removal zone 100 is provided with a series of tubes 105 through which the adsorbent flows. The purpose of these tubes is to provide a resistance to the flow of stripping gas so that the major proportion thereof will pass upwardly into heating zone 32. The flow of stripping gas downwardly through tubes 105 prevents the upward flow of purge gas into heating zone 32 which would otherwise contaminate the rich gas product. A mixture of stripping gas and purge gas thus formed comprises the seal gas and is removed from zone 100 via line 106 controlled by valve 107 which passes through cooler 108 and subsequently into separator 109. Herein the stripping gas is condensed and the purge gas constituents are removed via line 110 controlled by valve 111 and may subsequently be combined with the lean gas by introduction through line 60. The condensed stripping steam is removed from separator 109 via line 112 controlled by valve 113 which is actuated by level controller 114.

From seal gas removal zone 100 the hot stripped adsorbent passes directly into cooler 12 wherein the adsorbent is cooled indirectly in the presence of a countercurrent flow of purge gas which strips remaining traces of adsorbed steam from the adsorbent. The cool lean adsorbent then passes through adsorbent feeder zone 34 whereby control over the adsorbent flow rate through the column is maintained and subsequently into bottom zone 35 from where it is recirculated as described above by suspension in a cool fraction of the lean gas at a temperature of about 100° F. to 150° F. in distinction to previous operations wherein a lift gas of 500° F. to 600° F. was used. This increases the lifting properties of the lift gas permitting lower velocities of gas in lift line 50, decreased charcoal attrition rates, and increased charcoal-lift gas ratios in the lift line as well as materially simplifying the construction of the apparatus.

The lean gas product contains only 0.16% impurities and comprises 99.8% of a mixture of hydrogen and methane. The first side cut is a 99.51% pure $C_2$ hydrocarbon consisting approximately of 25% ethylene and 75% ethane. The second side cut comprises a 99.30% pure $C_3$ hydrocarbon fraction containing over 30% propylene. The unusually high purity of these fractions is attributed to the manner in which they are separated from the feed gas, the separation of $C_1$ from $C_2$ hydrocarbon in the absence of $C_3$ hydrocarbons and the separation of $C_2$ and $C_3$ hydrocarbons in the absence of $C_1$ hydrocarbon.

EXAMPLE II

As an example of previous operation in the separation of this gaseous mixture wherein the $C_3$ and $C_4$ hydrocarbons are separated as a rich gas, and $C_2$ hydrocarbons are separated as a single side cut gas and the methane and hydrogen are separated as a lean gas product, a charcoal rate of between 360,000 and 370,000 pounds per hour is required. Further, between 25% and 30% more lift gas circulation is required in lifting the same amount of charcoal with hot lift gas compared to the process of the present invention. Thus the improved separation by means of the process above described is at once apparent.

The foregoing examples have shown the use of a separation zone which is complex in arrangement to permit the production of four substantially pure fractions. However, the process of this invention may be modified to effect simplification of the separation zone whereby two or only three products are prepared from the gaseous mixture.

EXAMPLE III

In one modification of the separation zone a single stream of adsorbent is employed which passes successively through one adsorption zone and one rectification zone. In this instance the feed gas may be introduced via line 67 into primary adsorption zone 25 and with valve 70 closed, the lean gas is removed via line 115 controlled by valve 116. With valve 81 closed zones 27 and 29 comprise a single rectification zone wherein the rich adsorbent is rectified to free it of less readily adsorbable constituents. The rectified adsorbent is subsequently treated as above described to produce a rich gas product therefrom. In this modification the entire upper portion is not used and valves 120, 70, 73, 78, 81, 84 and 120 are closed. Valves may be also provided in lines 86 to prevent movement of adsorbent through the secondary separation zone.

EXAMPLE IV

A similar operation may be carried out in the upper portion of the column separately or simultaneously by introducing a feed gas, which may be different or the same as the feed gas introduced below in the primary separation zone described in Example III, via line 117 controlled by valve 118 into engaging zone 16. A lean gas is removed as in Example I from zone 14 and the rich adsorbent subsequently passes into zone 17 for rectification or directly through zones 17, 19 and 21 into primary rectification zone 29. Thus in the apparatus shown on the drawing two simultaneous simple separations may be made. This modification is particularly adaptable to the separation of two gases containing the same more readily adsorbable constituents so that from the two feed gases, one rich gas product is prepared and two lean gas products.

EXAMPLE V

In addition to the simple separation, where two products only are produced, provision may be made in the secondary separation zone for the production of one or more side cut products. In this case the feed gas is introduced via line 117, the lean gas is removed as before via line 72, the rich adsorbent is rectified with a side cut gas reflux in zone 17, rich gas reflux is introduced via line 80 into zones 19 and 21 which act in this modification as a single rectification zone wherein valve 84 is closed, the side cut gas constituents are desorbed and removed via line 77, and the rectified adsorbent passes via lines 86 into primary rectification zone 29. From here the rich rectified adsorbent passes into the heating zone and the rich gas product is desorbed.

In this modification a feed gas introduced into the secondary separation zone is separated into two fractions in addition to the rich gas product. It is of interest to note that this side cut operation may be carried on simultaneously with a simple separation of feed introduced via line 67 into the primary separation zone. Thus two feed gases may be processed simultaneously in a single column.

EXAMPLE VI

Another modification of the separation zone permits the production of a single rectified side cut in addition to the lean gas and rich gas products. In this modification the feed gas enters zone 16 via line 117 and contacts one stream of adsorbent flowing through secondary separation zone and a lean gas product is produced via line 72. Valves 69, 70, 78, 81, and 84 are closed. The rich adsorbent thus formed passes via lines 86 into rectification zone 29 wherein it is contacted with a rich gas reflux and constituents present in the side cut gas are thereby desorbed. Zones 25 and 27 are in this case a single rectification zone, zones 17, 19, and 21 are not used, and the rectified side cut is removed via line 115 controlled by valve 116. Thus the feed gas is contacted with a first portion of the adsorbent and a second portion of adsorbent is employed to adsorb the more readily adsorbable constituents from a gas desorbed from the combined stream of adsorbent leaving a rectified side cut from which both less readily and more readily adsorbable constituents have been substantially completely removed.

EXAMPLE VII

In a further modification of the separation zone two individual streams of adsorbent are employed as in Example V except that a primary and a secondary reflux gas are employed. The feed gas is introduced into zone 15 to contact a first adsorbent stream. The lean gas product is removed via line 72 and valves 78 and 84 are closed making zones 17, 19 and 21 a single rectification zone into which a secondary reflux is introduced via line 80. The combined adsorbent is treated in zone 29 by a rich gas reflux from which the secondary reflux is desorbed. Valves 68 and 116 are closed and part of the secondary reflux passes into zone 27 to contact the second adsorbent stream wherein the side cut gas is desorbed and more readily adsorbable constituents are adsorbed. The side cut gas product is partly introduced into zone 25 wherein a primary reflux gas is desorbed and is conveyed via line 69 to the feed gas inlet in line 117 while the remainder of the side cut gas product passes via line 119 controlled by valve 120 to production.

In each of the foregoing examples, the same manner of treating the rich adsorbent to desorb the rich gas product, the sealing of the heating zone from the cooling zone, and the cooling of hot lean adsorbent prior to removal from the column is employed. Thus, in all the described modifications of the separation zone the same advantages are realized which are due to operating the heating, sealing and cooling zones in sequence as described and the variation in the separation zone enables a gaseous feed mixture to be separated into a number of different fractions.

It is to be understood, however, that the specific separations of hydrocarbon gas mixtures used in the previous examples, is used here only in the purposes of clear description and that this invention of an improved apparatus and process for the separation by selective adsorption of gaseous mixtures applies equally well to other hydrocarbon or nonhydrocarbon gaseous mixtures.

For application to the selective adsorption process as herein described, granular adsorbents ranging from 12 to 20 mesh in size are preferred. However, other ranges of particle size for example, 10 to 30 mesh, are applicable. In some specific applications, granules as large as about two mesh are applicable and in certain other specific instances powdered adsorbents may be applied having small granules as fine as about 100 mesh or finer may be used. Of the various adsorbents which are applicable for use in the selective adsorption process as herein described, it is preferable to employ activated granular charcoal and particularly an activated vegetable charcoal with granules of from 12 to 20 mesh in size, although other adsorbents such as silica gel, activated aluminum oxide, activated bauxite, animal and mineral carbons, and various adsorbents prepared from iron and chromium oxides, and other adsorbents are applicable.

In the description of the improved selective adsorption apparatus the adsorbent was conveyed from the lower portion of the selective adsorption column to the upper portion thereof by means of a gas lift employing a fraction of the lean gas produced in the process. In certain instances other typical means of conveying granular solids may be employed such as the utilization of elevator means positioned in a proper housing so as to withstand the pressure of operation. The utilization of a gas lift, however, is preferred in view of certain difficulties of maintenance and operation of elevators at elevated pressures.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for separating a gaseous mixture which comprises passing a substantially compact moving bed of solid granular adsorbent by gravity successively through a separation zone, a desorption zone, a seal gas removal zone and a cooling zone, dividing said adsorbent into a first and second stream for passage through said separation zone as independent and substantially compact moving beds, contacting one adsorbent stream with said gaseous mixture, contacting the other adsorbent stream with another gas stream, subsequently combining said first and second adsorbent streams upon withdrawal from said separation zone prior to introduction into said desorption zone, heating the adsorbent containing adsorbed constituents within said desorption zone, contacting the heated adsorbent with a countercurrent flow of stripping gas to desorb the more readily adsorbable constituents as a rich gas leaving a lean adsorbent, passing said lean adsorbent through said seal gas removal zone and subsequently through said cooling zone, passing a portion of the unabsorbed lean gas fraction of said gaseous mixture through said cooling zone countercurrent to said lean adsorbent, passing a portion of said stripping gas from said desorption zone concurrently with said adsorbent into said seal gas removal zone, maintaining said seal gas removal zone at a pressure below the pressure of said desorption and cooling zones, combining said portion of said lean gas with said portion of stripping gas in said seal gas removal zone, removing the mixture thus formed as a seal gas therefrom and employing another portion of said lean gas to suspend cool lean adsorbent removed from said cooling zone for conveyance back to said separation zone.

2. A process according to claim 1 wherein said gaseous mixture to be separated is contacted with said first stream of adsorbent leaving an unadsorbed gas, subsequently contacting said unadsorbed gas with said second stream of adsorbent, removing a lean gas product from said second stream, and removing at least one side cut gas product from said second stream.

3. A process according to claim 1 wherein said gaseous mixture is contacted with said second stream of adsorbent leaving an unadsorbed lean gas product, in combination with the step of contacting said first stream with a gas reflux as said other gas stream to produce a side cut gas product.

4. A process according to claim 1 wherein said gaseous mixture is contacted with said second adsorbent stream leaving an unadsorbed lean gas product, contacting said first adsorbent stream with a side cut gas reflux to desorb a primary reflux gas, contacting said second stream of adsorbent with said primary reflux gas, and subsequently contacting said first stream with another gas reflux as said other gas stream to produce a side cut gas product.

5. An apparatus for separating a gaseous mixture which comprises a substantially vertical column provided with a separation section, a heating section, a seal gas removal section, and a cooling section at the bottom of said column, means for transporting cool lean adsorbent from said cooling section to the top of said column for passage therethrough as a compact moving bed, means for introducing a stripping gas into said heating section and purge gas into said cooling section, means for removing said purge gas and part of said stripping gas as a seal gas from said seal gas removal section, means for removing more readily adsorbed gases from said desorption section as a rich gas product, inlet means for introducing said gaseous mixture into said separation section, outlet means for removing a substantially unadsorbed lean gas product from said separation section, said means for transporting said cool lean adsorbent including means for suspending said adsorbent in a portion of said unadsorbed gas for conveyance thereof as a suspension.

6. An apparatus according to claim 5 wherein said separation section is provided with a first and a second separation section, means for dividing the flow of granular adsorbent at a point above the upper extremity of said first and second separation sections into a first and second stream, means for introducing said first and second adsorbent streams into the said first and second separation sections respectively, means for maintaining said first and second adsorbent streams independent of each other, and means for combining said first and second adsorbent streams withdrawn from said first and second separation sections prior to introduction into said heating section.

7. An apparatus according to claim 6 in combination with inlet conduit means for a gaseous mixture into said first separation section, outlet conduit means for unadsorbed gas therefrom communicating with second separation section, outlet conduit means therefrom for a lean gas product, outlet conduit means for at least one side cut gas product from said second separation section, and outlet conduit means for a rich gas product from said heating section.

8. An apparatus according to claim 6 in combination with conduit means for introducing said gaseous mixture into said second separation section, outlet conduit means for an unadsorbed lean gas product therefrom, conduit means for introducing a gas reflux into said first separation section and outlet conduit means for a side cut gas product therefrom.

9. An apparatus according to claim 6 wherein said inlet means for said gaseous mixture opens into said second separation section, said outlet means for unadsorbed lean gas product opens therefrom, in combination with additional inlet means for a gas reflux which opens into said first separation section, outlet conduit means therefrom for a primary reflux gas, conduit means for passing said primary reflux gas into said second separation section, and outlet conduit means from said first separation section for a side cut gas product at a point above said additional inlet means.

10. A process for separating gaseous mixtures by selective adsorption which comprises circulating a substantially compact moving bed of granular adsorbent downwardly by gravity through a column, dividing said moving bed into a first and a second stream, passing said streams respectively through a first and a second separation zone, subsequently combining said streams for passage through a desorption zone and a heating zone, introducing a feed gas into each of said separation zones, removing a stream of unadsorbed gas from each of said separation zones, contacting said combined adsorbent in said desorption zone with a stripping gas to desorb the adsorbed constituents of said feed gases as a rich gas product, subsequently heating said adsorbent to form a hot lean adsorbent, passing said hot lean adsorbent through a seal gas removal zone maintained at a lower pressure than the adjacent heating and cooling zones, removing a seal gas from said seal gas removal zone, subsequently cooling said hot lean adsorbent, and conveying the cool lean adsorbent removed from said column as a suspension in a portion of said unadsorbed gas to said separation zones for repassage therethrough.

11. A process for gas fractionation according to claim 10 in combination with the step of rectifying at least one side cut gas product containing constituents of intermediate adsorbability from said second adsorbent stream first contacting the adsorbent stream with a side cut gas reflux thereby preferentially desorbing traces of lean gas, then contacting the thus treated adsorbent with a reflux containing more readily adsorbable constituents thereby preferentially desorbing said side cut gas and removing part of the thus desorbed side cut gas as a product while employing the remainder as said side cut gas reflux.

12. A process for gas fractionation which comprises flowing a moving bed of granular adsorbent through an adsorption column provided with a second separation zone, a first separation zone, a desorption zone, a seal gas removal zone, and a cooling zone at successively lower levels therein, circulating said moving bed of solid granular adsorbent through said column, dividing said moving bed into a first and a second adsorbent stream for passage through said first and second separation zones, subsequently combining said streams, contacting a first feed gas with said first adsorbent stream to adsorb more readily adsorbable constituents leaving a first lean gas product unadsorbed, contacting a second feed gas with said second adsorbent stream to adsorb more readily adsorbable constituents therein leaving a second lean gas product unadsorbed, desorbing the adsorbed constituents from the combined adsorbent in said desorption zone in the presence of a stripping gas to form a rich gas product, maintaining said seal gas removal zone at a lower pressure than either of said desorption and cooling zones, removing a seal gas therefrom in the absence of externally added gas, and suspending cool lean adsorbent removed from said cooling zone in a portion of one of said lean gases for conveyance from the bottom to the top of said column.

13. A process according to claim 12 wherein said first and said second feed gases have a common more readily adsorbable constituent.

14. A process for separating a gaseous mixture which comprises passing a substantially compact moving bed of solid granular adsorbent by gravity through a vertical column provided at successively lower levels therein with an adsorption zone, a rectification zone, an indirect heating and desorption zone, a seal gas removal zone and an indirect cooling zone, introducing said gaseous mixture into said adsorption zone forming a rich adsorbent containing the more readily adsorbable constituents and a substantially unadsorbed lean gas containing the less readily adsorbable constituents, removing said lean gas from said adsorption zone, removing cool lean adsorbent from said cooling zone, suspending said cool lean adsorbent in one part of said lean gas, conveying said suspension from said cooling zone to said adsorption zone, passing another part of said lean gas countercurrent to the adsorbent within said cooling zone as a purge gas, introducing a stripping gas into said column between said desorption zone and said seal gas removal zone so that a first part and a second part thereof pass respectively into each of the aforesaid zones, simultaneously indirectly heating said adsorbent within said desorption zone and contacting the heated adsorbent countercurrently with said first part of said stripping gas thereby desorbing said more readily adsorbable constituents as a rich gas, introducing part of the thus desorbed rich gas together with stripping gas as a reflux gas into said rectification zone to desorb less readily adsorbable constituents, removing the remaining part of said rich gas as a rich gas product, maintaining said seal gas removal zone at a pressure less than that of said desorption and said cooling zones and removing said purge gas and said second part of said stripping gas as a seal gas from said seal gas removal zone to prevent the passage of stripping gas into said cooling zone and passage of purge gas into said desorption zone.

15. A process for separating a gaseous mixture which comprises passing a substantially compact moving bed of granular activated charcoal by gravity through a vertical column provided at successively lower levels therein with an adsorption zone, a rectification zone, an indirect heating and desorption zone, a seal gas removal zone and an indirect cooling zone, introducing said gaseous mixture into said adsorption zone forming a rich charcoal containing the more readily adsorbable constituents and leaving a substantially unadsorbed lean gas containing the less readily adsorbable constituents, removing said lean gas from said adsorption zone, removing cool lean charcoal from said cooling zone, suspending said cool lean charcoal in one part of said lean gas, conveying said suspension from said cooling zone to said adsorption zone, passing another part of said lean gas countercurrent to the activated charcoal within said cooling zone as a purge gas, introducing steam into said column between said desorption zone and said seal gas removal zone so that a first part and a second part thereof pass respectively into each of the aforesaid zones, simultaneously indirectly heating said charcoal within said desorption zone and countercurrently contacting the thus heated charcoal countercurrently with said first part of steam thereby desorbing said more readily adsorbable constituents as a rich gas, introducing part of the thus desorbed rich gas together with steam as a reflux gas into said rectification zone to desorb less readily adsorbable constituents, removing the remaining part of said rich gas and steam as a rich gas product, maintaining said seal gas removal zone at a pressure less than that of said desorption and said cooling zones and removing said purge gas and said second part of said steam as a seal gas from said seal gas removal zone to prevent the passage of steam into said cooling zone and the passage of purge gas into said desorption zone.

16. A process according to claim 15 wherein said cool lean adsorbent is conveyed by means of said suspension in a portion of said lean gas product, the suspension is subsequently separated after conveyance, and the steps of passing the separated adsorbent by gravity into said adsorption zone and recirculating the separated portion of lean gas to suspend and convey further quantities of said cool lean adsorbent.

17. In a continuous process for separating a gaseous mixture which involves the steps of flowing a moving bed of granular adsorbent by gravity through a vertical column, conveying adsorbent removed from the bottom of said column to the top thereof, contacting part of said moving bed with said gaseous mixture to form a rich adsorbent and a lean gas product, subsequently heating and stripping adsorbed constituents from said rich adsorbent forming a rich gas and a hot lean adsorbent, then cooling said hot adsorbent prior to contacting further quantities of said gaseous mixture, the improvement which comprises flowing said moving bed of adsorbent by gravity through said column containing an adsorption zone, a heating zone, a seal gas removal zone substantially filling the entire cross-sectional area of said column and a cooling zone in succession, simultaneously heating said adsorbent indirectly while countercurrently contacting the heated adsorbent with a stripping gas in said heating zone, passing a purge gas comprising part of said lean gas product through said cooling zone in direct contact with the adsorbent therein, maintaining said seal gas removal zone at a pressure less than the pressures maintained in said heating and cooling zones, maintaining the temperature of the adsorbent within said seal gas removal zone substantially at the maximum adsorbent temperature produced during passage through said heating zone, removing all of said purge gas and at least part of said stripping gas as a seal gas from said seal gas removal zone and conveying cool lean adsorbent removed from the bottom of said column to the top of said column as a suspension in another part of said lean gas product.

18. A process for separating a gaseous mixture which comprises passing a moving bed of substantially compact granular adsorbent by gravity successively through a separation zone, a rectification zone, a heating and desorption zone, a seal gas removal zone and a cooling zone, passing said gaseous mixture through said separation zone forming a rich adsorbent containing the more readily adsorbable constituents and a substantially unadsorbed lean gas containing the less readily adsorbable constituents, subsequently countercurrently contacting said rich adsorbent with a reflux gas containing said more readily adsorbable constituents and a stripping gas to desorb traces of less readily absorbable constituents forming a rectified adsorbent, simultaneously heating said rectified adsorbent indirectly and countercurrently contacting said rectified adsorbent directly with a stripping gas in said heating and desorption zone forming a desorbed rich gas and a hot lean adsorbent, subsequently flowing said hot lean adsorbent substantially at the maximum temperature to which the adsorbent was heated in said heating and desorption zone into and through said seal gas removal zone and then into and through said cooling zone, passing a portion of said lean gas as a purge gas through said cooling zone in direct countercurrent contact with said adsorbent into said seal gas removal zone, passing a portion of said stripping gas from said heating zone into said seal gas removal zone forming a seal gas mixture with said purge gas, removing said seal gas from said seal gas removal zone in the presence of said adsorbent at said maximum temperature, removing cool lean adsorbent from said cooling zone, suspending said adsorbent in another portion of said unadsorbed lean gas, passing said suspension substantially at the temperature of said cool lean adsorbent through a conveyance zone to said separation zone and thereby maintaining a recirculating granular adsorbent.

19. A process for separating a gaseous mixture which comprises passing a substantially compact moving bed of solid granular adsorbent by gravity through a vertical column containing a separation zone having an adsorption zone and a rectification zone, a heating and desorption zone, a seal gas removal zone of substantially the same cross-sectional area as the aforesaid zones and a cooling zone in succession, passing said gaseous mixture through said adsorption zone forming a rich adsorbent and a substantially unadsorbed lean gas, countercurrently contacting said rich adsorbent with a rich gas reflux containing a stripping gas in said rectification zone thereby desorbing traces of said lean gas forming a rectified adsorbent, simultaneously indirectly heating said rectified adsorbent while directly contacting said adsorbent with a stripping gas countercurrently in said heating and desorption zone thereby desorbing said rich gas and leaving a hot lean adsorbent, passing said hot lean adsorbent substantially at its maximum temperature through said seal gas removal zone and subsequently through said cooling zone, maintaining said seal gas removal zone at a pressure less than said heating and cooling zones, passing one portion of said lean gas through said cooling zone as a purge gas, passing one portion of said stripping gas from said desorption zone into said seal gas removal zone, removing a seal gas comprising said portion of said stripping gas and all of said purge gas from said seal gas removal zone in the presence of said hot lean adsorbent at its maximum temperature, removing cool lean adsorbent from the lower portion of said cooling zone, suspending said cool lean adsorbent in another portion of said lean gas as a gas lift, passing the suspension through a conveyance zone to a point adjacent said separation zone, separating suspended cool lean adsorbent from said suspension, flowing the cool adsorbent by gravity into said separation zone, recirculating said lift gas to suspend further quantities of cool lean adsorbent, maintaining a uniform withdrawal of adsorbent throughout the entire cross-sectional area of said column to establish uniform adsorbent flow throughout said zones in said column and controlling the adsorbent flow rate throughout said column at a single point adjacent the outlet of said cooling zone.

20. A process for separating a gaseous mixture which comprises passing a substantially compact moving bed of solid granular activated charcoal by gravity through a vertical column containing in succession a separation zone having an adsorption zone and a rectification zone, a heating and desorption zone, a seal gas removal zone of substantially the same cross-sectional area as the aforesaid zones and a cooling zone, passing said gaseous mixture through said adsorption zone forming a rich charcoal and a substantially unadsorbed lean gas, countercurrently contacting said rich charcoal with a rich gas reflux containing steam in said rectification zone thereby desorbing traces of said lean gas forming a rectified charcoal, simultaneously indirectly heating said rectified charcoal while directly contacting countercurrently the thus heated charcoal with steam in said heating and desorption zone thereby desorbing said rich gas and leaving a hot lean charcoal, passing said hot lean charcoal substantially at its maximum desorption zone temperature through said sealed gas removal zone and subsequently through said cooling zone, maintaining said seal gas removal zone at a pressure less than said desorption and cooling zones, passing one portion of said lean gas through said cooling zone as a purge gas into said seal gas removal zone, passing part of said steam from said desorption zone thereinto, removing a seal gas from said seal gas removal zone in the presence of said hot lean charcoal at said maximum temperature, said seal gas comprising said portion of said steam and all of said purge gas, removing cool lean charcoal from the lower portion of said cooling zone, suspending said cool lean charcoal in another portion of said lean gas as a lift gas, passing the suspension through a conveyance zone to a point adjacent said separation zone, separating suspended cool lean charcoal from said suspension, flowing the cool charcoal by gravity into said separation zone, recirculating said lift gas to suspend further quantities of cool lean charcoal, maintaining a uniform withdrawal of activated charcoal throughout the entire cross-sectional area of said column to establish uniform activated charcoal flow throughout said zones therein and controlling the activated charcoal flow rate throughout said column at a single point adjacent the outlet of said cooling zone.

21. In a process for separating a gaseous mixture by the selective adsorption of more readily adsorbable constituents on a solid granular adsorbent leaving less readily adsorbable constituents as a substantially unadsorbed lean gas, recovering adsorbed constituents as a rich gas from said adsorbent, and employing the adsorbent in a vertical column as a recirculating moving bed, the improvement which comprises passing the rich adsorbent following adsorption first into a heating and desorption zone and subsequently through a seal gas removal zone and a cooling zone immediately prior to removing said adsorbent from said column, simultaneously indirectly heating said adsorbent while countercurrently contacting the adsorbent with a stripping gas within said heating and desorption zone, forming a hot lean adsorbent and a desorbed rich gas product, countercurrently contacting said lean adsorbent within said cooling zone with a portion of said lean gas as a purge gas, flowing said purge gas through said cooling zone into said seal gas removal zone, removing a seal gas therefrom comprising said purge gas and a portion of said stripping gas from the hot substantially uncooled lean adsorbent present in said seal gas removal zone, said seal gas removal zone having substantially the same cross-sectional area as said heating and cooling zones.

22. In a continuous adsorptive gas fractionation process wherein a moving bed of solid granular adsorbent is contacted with a gaseous mixture to be separated forming a rich adsorbent containing the more readily adsorbable constituents and leaving as an unadsorbed lean gas fraction the less readily adsorbable constituents thereof, wherein said rich adsorbent is treated in a desorption zone at an elevated temperature in the presence of a stripping gas for the liberation of the adsorbed more readily adsorbable constituents, and wherein the lean adsorbent resulting is subsequently cooled in an indirect cooling zone in the presence of a purge gas, the improvement in preventing gas flow between said desorption and cooling zones which comprises the steps of interposing a seal gas removal zone therebetween, said seal gas removal zone having substantially the same cross-sectional area as said desorption and cooling zones thereby maintaining a uniform granular adsorbent flow throughout the cross-sectional area of said desorption, seal gas removal and cooling zones, flowing said lean adsorbent from said desorption zone at said elevated temperature through said seal gas removal zone into said indirect cooling zone, passing part of said unadsorbed lean gas as said purge gas through said indirect cooling zone in the absence of a flow of said stripping gas and in direct countercurrent contact with said lean adsorbent to desorb traces of said stripping gas from said lean adsorbent and pre-saturate said adsorbent with the constituents of the unadsorbed lean gas, maintaining the adsorbent within said seal gas removal zone at substantially the maximum temperature to which it was heated in said desorption zone, maintaining said seal gas removal zone at a pressure less than that maintained in said desorption and cooling zones thereby flowing part of said stripping gas from said desorption zone and all of said purge gas into said seal gas removal zone forming a seal gas mixture therein and removing said mixture from said seal gas removal zone.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,825,707 | Wagner, Jr. | Oct. 6, 1931 |
| 1,836,301 | Bechthold | Dec. 15, 1931 |
| 2,351,214 | Kaufman et al. | June 13, 1944 |
| 2,379,195 | Simpson et al. | June 26, 1945 |
| 2,384,311 | Kearby | Sept. 4, 1945 |